(12) United States Patent
Holleczek et al.

(10) Patent No.: US 11,073,614 B2
(45) Date of Patent: Jul. 27, 2021

(54) LIDAR SENSOR FOR DETECTING AN OBJECT

(71) Applicant: Robert Bosch GmbH, Stuttgart (DE)

(72) Inventors: Annemarie Holleczek, Ludwigsburg (DE); Jan Sparbert, Rutesheim (DE)

(73) Assignee: Robert Bosch GmbH, Stuttgart (DE)

( * ) Notice: Subject to any disclaimer, the term of this patent is extended or adjusted under 35 U.S.C. 154(b) by 353 days.

(21) Appl. No.: 15/848,179

(22) Filed: Dec. 20, 2017

(65) Prior Publication Data

US 2018/0172829 A1 Jun. 21, 2018

(30) Foreign Application Priority Data

Dec. 21, 2016 (DE) .................. 102016225797.8

(51) Int. Cl.
| | | |
|---|---|---|
| *H01J 3/14* | (2006.01) | |
| *G01S 17/04* | (2020.01) | |
| *G01S 17/42* | (2006.01) | |
| *G01S 7/481* | (2006.01) | |
| *G01S 7/4911* | (2020.01) | |
| *G01S 7/4912* | (2020.01) | |

(52) U.S. Cl.
CPC ............ *G01S 17/04* (2020.01); *G01S 7/4813* (2013.01); *G01S 7/4817* (2013.01); *G01S 7/4911* (2013.01); *G01S 7/4912* (2013.01); *G01S 17/42* (2013.01)

(58) Field of Classification Search
CPC .... G01S 7/4813; G01S 7/4911; G01S 7/4912; G01S 17/026; G01S 17/42; G01S 7/4817
USPC ....................................................... 250/216
See application file for complete search history.

(56) References Cited

U.S. PATENT DOCUMENTS

| | | | | |
|---|---|---|---|---|
| 5,815,251 A | * | 9/1998 | Ehbets ..................... | G01C 3/08 |
| | | | | 356/5.01 |
| 8,072,663 B2 | * | 12/2011 | O'Neill ................ | G02B 26/105 |
| | | | | 359/199.3 |
| 2006/0255148 A1 | * | 11/2006 | Barkan .............. | G06K 7/10881 |
| | | | | 235/462.36 |
| 2007/0296367 A1 | * | 12/2007 | Buhler ................ | F16C 32/0442 |
| | | | | 318/607 |
| 2010/0103427 A1 | * | 4/2010 | Shigematsu .......... | G01S 7/4817 |
| | | | | 356/447 |
| 2011/0040482 A1 | * | 2/2011 | Brimble ................ | G01S 7/4814 |
| | | | | 701/301 |
| 2011/0168918 A1 | * | 7/2011 | Wimberger-Friedl ....... | |
| | | | | G01N 21/6428 |
| | | | | 250/459.1 |
| 2016/0291134 A1 | * | 10/2016 | Droz ..................... | G01S 7/4802 |
| 2019/0107623 A1 | * | 4/2019 | Campbell ............ | G02B 26/101 |

FOREIGN PATENT DOCUMENTS

| | | |
|---|---|---|
| DE | 4403297 A1 | 5/1995 |
| EP | 1102086 A2 | 5/2001 |

\* cited by examiner

*Primary Examiner* — Georgia Y Epps
*Assistant Examiner* — Kevin Wyatt
(74) *Attorney, Agent, or Firm* — Norton Rose Fulbright US LLP; Gerard Messina (57) ABSTRACT

A LIDAR sensor for detecting an object within a sampling space, includes a sampling unit that includes a magnetic channel, a guide element, and a movable component that is situated within the magnetic channel and is movable along the guide element under control of a control method that uses a linear drive.

24 Claims, 6 Drawing Sheets

LIDAR SENSOR FOR DETECTING AN OBJECT

CROSS-REFERENCE TO RELATED APPLICATIONS

The present application claims priority under 35 U.S.C. § 119 to DE 10 2016 225 797.8, filed in the Federal Republic of Germany on Dec. 21, 2016, the content of which is hereby incorporated by reference herein in its entirety.

FIELD OF THE INVENTION

The present invention relates to a LIDAR sensor, and a method for controlling a LIDAR sensor for detecting an object within a sampling space.

BACKGROUND

Sensor devices are known from the related art which allow detection of objects within a sampling space in the surroundings, for example of a vehicle. These include light detection and ranging (LIDAR) sensors, for example. Light is emitted from a light source, and the light that is reflected on or scattered at an object in the sampling space is subsequently received by a receiving unit.

A device for deflecting optical beams, preferably for deflecting laser beams, that includes mirror surfaces situated on a drivable solid of revolution is known from DE 4403297. The solid of revolution is made of a monocrystalline material. The mirror surfaces are formed by the crystal planes and have a rotationally symmetrical arrangement.

SUMMARY

The present invention is directed to a LIDAR sensor for detecting an object within a sampling space, including at least one sampling unit that includes at least one magnetic channel, at least one guide element, and at least one movable component that is situated within the magnetic channel and is controllable using a linear drive to move along the guide element.

A linear drive is a drive system with the aid of which the movable component can be driven to move. In an example embodiment, the linear drive is implemented as a linear motor. The guide element includes magnets for this purpose, and a magnetic field of the guide element can form. The movable component also includes magnets, and a magnetic field of the movable component can form. A magnet of the guide element can be implemented as an electromagnet. A magnet of the movable component can be implemented as an electromagnet. The movement of the movable component can be achieved by supplying the electromagnets with current having the appropriate polarity. The magnetic fields of the guide element and of the movable component can be combined in such a way that the movable component is pulled for a distance along a movement direction. The magnetic fields of the guide element and of the movable component can be combined in such a way that, at any point in time when the linear drive is used for moving the magnetic component, the movable components are repelled by the magnetic field behind them, and at the same time are attracted by the magnetic field situated in front in the direction of motion. When the movable component has reached a new position, this means that the attracting magnetic field is still exerting only a small force on the movable component, and the polarity of the electromagnets can thus be reversed. The movable component can be repelled from the instantaneous position and attracted by the next position. A continuous motion of the mechanical component is thus ensured.

An advantage of the present invention is that a mechanically robust sampling unit can be implemented. The linear drive is largely free of wear, and has a high fatigue strength. Various types of movement can be achieved. The movement of the movable component can be carried out, for example, as translation, as circular translation, or as rotation. The trajectory of the linear drive can be freely designed. Simple optical paths can be achieved. The LIDAR sensor can have an advantageous design, in particular for applications in motor vehicles. The installation volume of the LIDAR sensor can be reduced.

In one advantageous embodiment of the present invention, it is provided that the guide element is designed as a magnetic bearing. A magnetic bearing has magnetic forces that can allow a bearing and/or movement without material contact. The magnetic bearing can allow a movement of the movable element without material contact with the guide element.

An advantage of this embodiment is that the magnetic bearing is largely free of wear. It is necessary only to move an essentially small mass. A small electrical power can be sufficient to move the movable element. The magnetic bearing can be designed to be small enough to allow a small installation volume of the LIDAR sensor.

In an example embodiment of the present invention, the sampling unit also includes at least one permanent magnet. A permanent magnet can be part of the magnetic bearing. A magnet of the guide element can be implemented as a permanent magnet. A magnet of the movable component can be implemented as a permanent magnet. An advantage of this embodiment is that magnetic fields can be easily achieved with good reproducibility.

The magnetic channel can be formed by the magnetic fields of the magnets present in the sampling unit. The magnetic channel can include electromagnets and/or permanent magnets.

In another example embodiment of the present invention, the movable component is movable along the guide element with oscillation. An advantage of this embodiment is that the sampling space can be easily sampled with very good reproducibility.

In an example embodiment, the movable component is movable along the guide element with resonant oscillation. The movable component can be controlled in such a way that the movable component resonates more intensely. The movable component can behave as a damped harmonic oscillator. An advantage of this embodiment is that a small electrical power can be sufficient to move the movable element.

In an example embodiment, the guide element includes magnetic springs at its outer boundaries. The magnetic springs can be implemented as permanent magnets. The magnetic springs can be implemented as electromagnets. An advantage of this embodiment is that the movable component may be prevented from striking against the outer boundaries of the guide element or of the magnetic channel. In addition, the magnetic springs may be used for achieving the resonant oscillation of the movable component. The magnetic springs may act as a repelling force for the damped harmonic oscillation.

In an example embodiment, the sampling unit has a semicircular shape. In particular, the magnetic channel and the guide element have a semicircular shape. The movable component can thus move on a semicircular path. An advantage of this embodiment is that a large visual field of the LIDAR sensor can be achieved. The visual field can encompass an angular range of up to 120°, for example. Distortions during a measurement can be compensated for by the semicircular path.

In an example embodiment, the LIDAR sensor also includes a detector for receiving light. The movable component includes at least one first reflective optical element. The light that has been reflected from the object within the sampling space is deflected onto the detector with the aid of the first reflective optical element. The first reflective optical element can be designed as a mirror. The mirror can be planar or can be curved. The first reflective optical element can have a preferably large surface area. An advantage of this embodiment is that the first reflective optical element can be positioned very precisely in the magnetic channel by the movement of the movable component. The first reflective optical element can receive light from virtually any spatial angle of the sampling space, and can deflect light onto the detector virtually free of loss. As a result, small detector surfaces can be sufficient, and the manufacturing costs of the LIDAR sensor can be kept low.

To receive light from a three-dimensional sampling space, in an example embodiment of the present invention, the detector is designed as a detector gap. The detector can be designed as a detector array.

In an example embodiment, the detector is situated on a side of the sampling unit facing the sampling space. An advantage of this embodiment is that a small installation depth of the LIDAR sensor can be achieved. This can be advantageous in particular for applications in motor vehicles.

In an example embodiment, the LIDAR sensor also includes a light source for emitting light into the sampling space. The light source is preferably designed as a laser. The light source can be designed as a combination of multiple lasers. The light source can be part of the sampling unit. In this case, the light source can be positioned on the movable component. An advantage of this embodiment is that light can be emitted into virtually any spatial angle of the sampling space. Alternatively, the light source can be positioned at a predefined distance from the sampling unit.

To emit light into a three-dimensional sampling space, the light source can be expanded in one dimension. Alternatively, the light source can also be designed as a laser array.

In an example embodiment, the movable component includes at least one second reflective optical element. The light emitted from the light source is deflected into the sampling space with the aid of the second reflective optical element. The second reflective optical element can be designed as a mirror. The mirror can be planar, or may be curved. The second reflective optical element can have a preferably large surface area. An advantage of this embodiment is that the second reflective optical element can be positioned very precisely in the magnetic channel by the movement of the movable component. The second reflective optical element can emit light into virtually any spatial angle of the sampling space. Light can be emitted at a high transmission power. A preferably small exit window can be implemented. This can be advantageous for the necessary eye safety of the LIDAR sensor. In addition, preferably small cleaning areas result.

In an example embodiment, the LIDAR sensor also includes a refractive element. The refractive element is situated on a side of the sampling unit facing the sampling space. The refractive element can be an optical lens. The refractive element can act as a transmission aperture. The refractive element can act as a reception aperture. An advantage of this embodiment is that large transmission and/or reception apertures can be implemented. Simple optical systems such as single lenses can even be sufficient. Once again, a low installation height and/or a small installation depth of the LIDAR sensor can thus be achieved.

In an example embodiment, the LIDAR sensor also includes an optical filter. The optical filter is situated on a side of the sampling unit facing the sampling space. The optical filter can be positioned at a predefined distance from the sampling unit. Alternatively, the sampling unit can include the optical filter. The magnetic channel can, for example, include the optical filter as a coating on its outer side. An advantage of this embodiment is that the light strikes the sampling unit at small optical angles, in particular for a semicircular magnetic channel. A narrowband optical filter can thus be used. The signal-to-noise ratio can be increased.

In a method according to an example embodiment of the present invention for controlling a LIDAR sensor for detecting an object within a sampling space, where the LIDAR sensor includes at least one sampling unit, the method includes a step of controlling movement of a movable component of the sampling unit within a magnetic channel and along a guide element, using a linear drive.

In an example embodiment of the method, the guide element is designed as a magnetic bearing controlled using a bearing controller.

In an example embodiment of the method, a position of the movable component on the guide element is determined using the bearing controller.

Exemplary embodiments of the present invention are explained in greater detail below with reference to the appended drawings.

DETAILED DESCRIPTION

Figure 1A:
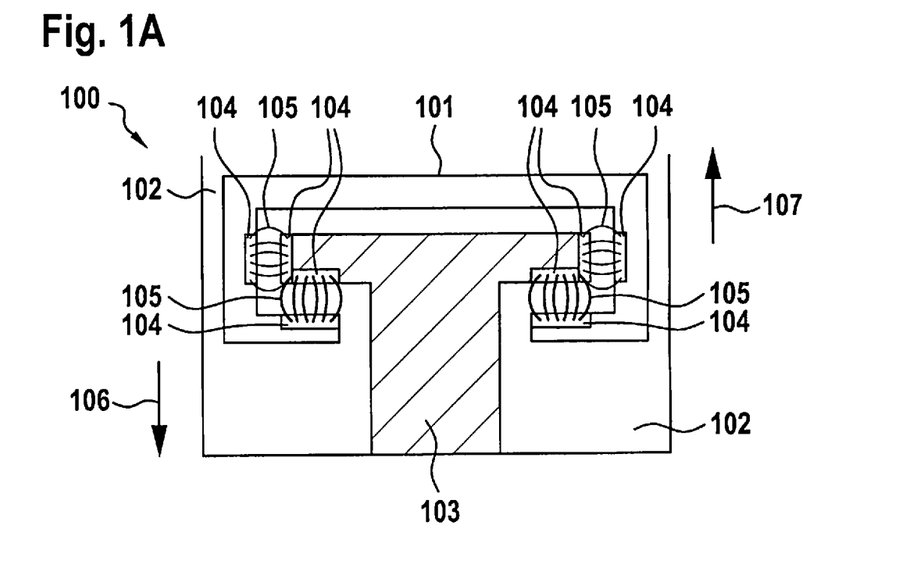
FIG. 1A shows a cross section of a sampling unit with a guide element, a movable component, and magnets of a magnetic bearing, according to an example embodiment of the present invention.

FIG. 1A shows, by way of example, the cross section of sampling unit 100. Sampling unit 100 includes a movable component 101. Movable component 101 is situated in magnetic channel 102, where it is movable along a T-shaped guide element 103. In the example, force of gravity 106 pulls movable component 101 downwardly onto guide element 103. However, guide element 103 is designed as a magnetic bearing due to magnets 104. Arrow 107 indicates the upwardly directed magnetic force due to the magnetic bearing. Thus, as a whole this results in a magnetic force 105 that holds movable component 101 above guide element 103 in a quasi-floating manner. Magnetic force 105 is indicated by magnetic field lines in the drawing. In addition, as the result of magnetic force 105, there is no material contact between movable component 101 and guide element 103 at the sides. Movable component 101 is thus movable without material contact. The control of the magnetic bearing can take place using a bearing controller.

Figure 1B:
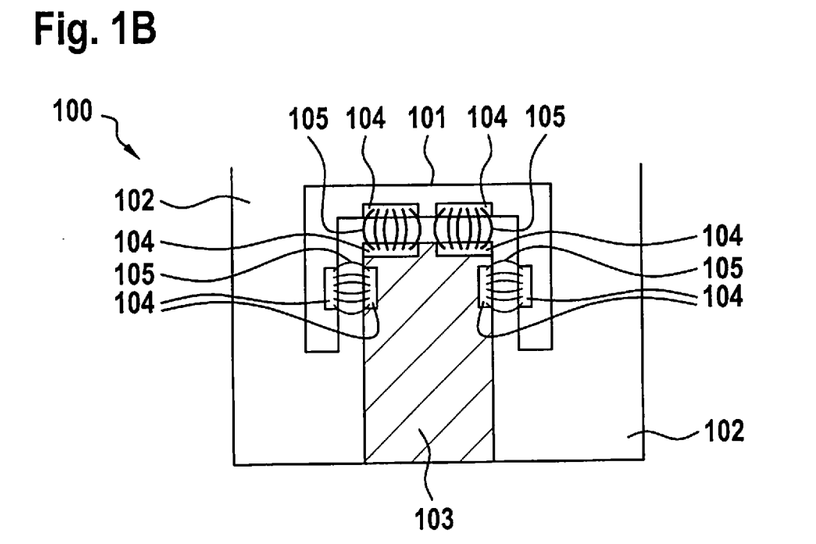
FIG. 1B shows a cross section of a sampling unit with a guide element, a movable component, and magnets of a magnetic bearing, according to another example embodiment of the present invention.

FIG. 1B shows by way of example a cross section of a sampling unit 100 having another design of guide element 103 and movable component 101. Sampling unit 100 includes the same elements as sampling unit 100 in FIG. 1A. The shapes of guide element 103 and of movable component 101 differ from the preceding example. For this reason, the position of magnets 104 within the sampling unit also differs. Also in this example, magnetic force 105 forms, as the result of which movable component 101 is movable above and along guide element 103 in a quasi-floating manner. The control of the magnetic bearing can take place using a bearing controller.

Figure 2:
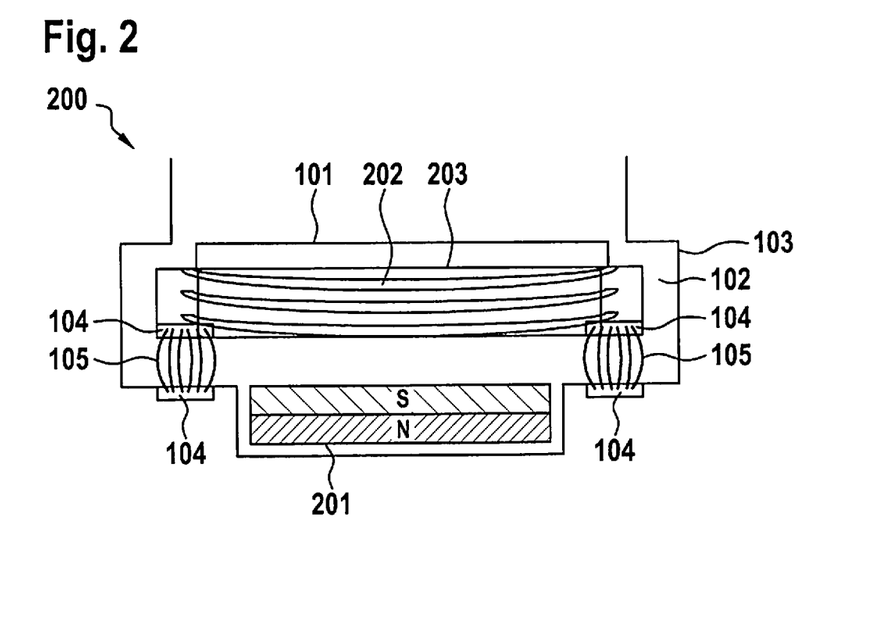
FIG. 2 shows a cross section of a sampling unit with a guide element, a movable component, and magnets of a linear drive, according to another example embodiment of the present invention.

FIG. 2 shows by way of example the cross section of a sampling unit 200 according to another example embodiment. Guide element 103 and movable component 101 each have a different shape compared to the preceding examples. FIG. 2 also shows in particular the magnets of the linear drive. The linear drive is implemented as a linear motor. Guide element 103 includes magnets 201 for this purpose. Magnets 201 are designed as permanent magnets in the example. Magnets 201 are positioned in the lower part of guide element 103, on the base. Movable component 101 includes magnets 202 for implementing the linear drive. Magnets 202 are designed as electromagnets in the example, and can include a magnetic core 203. The electromagnets are designed as coils. Magnets 202 are positioned in the base of component 101. Sampling unit 200 can thus be implemented with a flat design.

Figure 3:
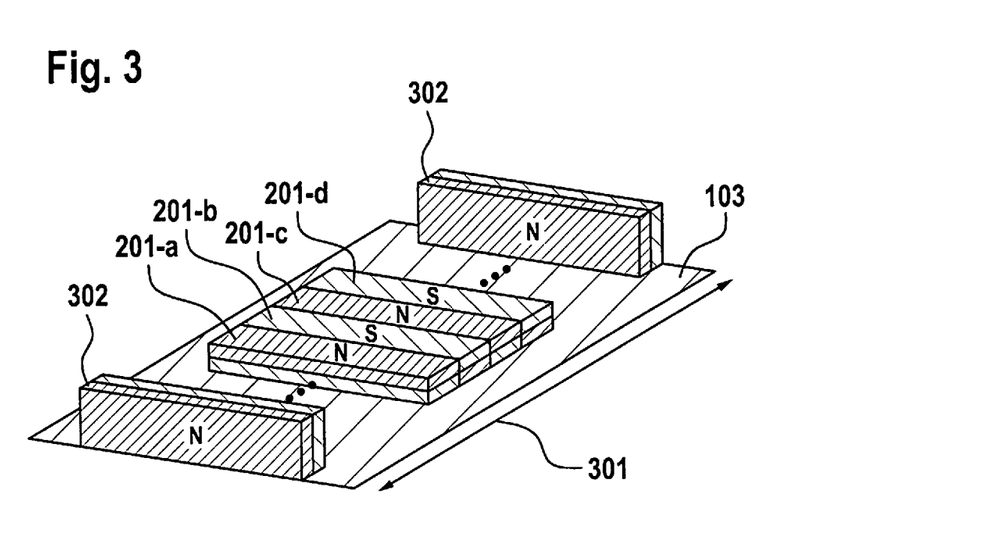
FIG. 3 shows a schematic illustration of a guide element of a sampling unit according to FIG. 2, including the magnets of the linear drive, according to an example embodiment of the present invention.

FIG. 3 schematically shows guide element 103 of sampling unit 200 from FIG. 2. Guide element 103 is illustrated in a simplified form here as a plane. This plane represents the area of guide element 103 on which magnets 201 are situated. In the example shown, guide element 103 has a linear design. The plane of the guide element 103 is correspondingly illustrated with a rectangular shape. Guide element 103 can also have some other shape, for example a semicircular shape. In this case, the plane can likewise have a semicircular shape. For a semicircular guide element 103, magnets 201 can be shaped and/or arranged in such a way that they match the shape of guide element 103. The following discussions apply for any shape of guide element 103.

Magnets 201 are designed as permanent magnets in the example. A predefined number of magnets 201 are situated resting, in a manner of speaking, on the plane. Magnets 201 are situated in such a way that their respective north and south poles are situated one above the other along a perpendicular to the plane. The four magnets 201-*a*, 201-*b*, 201-*c*, and 201-*d* are illustrated here as an example. The north pole and the south pole of magnets 201-*a*, 201-*b*, 201-*c*, and 201-*d* in each case alternate with one another along movement direction 301. Due to the operating principle of the linear drive, in particular the linear motor, described above, movable component 101 (not shown for the sake of simplicity) can be moved along movement direction 301, along the guide element and within magnetic channel 102 of sampling unit 200. The position of movable component 101 on guide element 103 can be determined using the bearing controller of the magnetic bearing.

FIG. 3 also shows magnetic springs 302, which guide element 103 can include at its outer boundaries.

Figure 4:
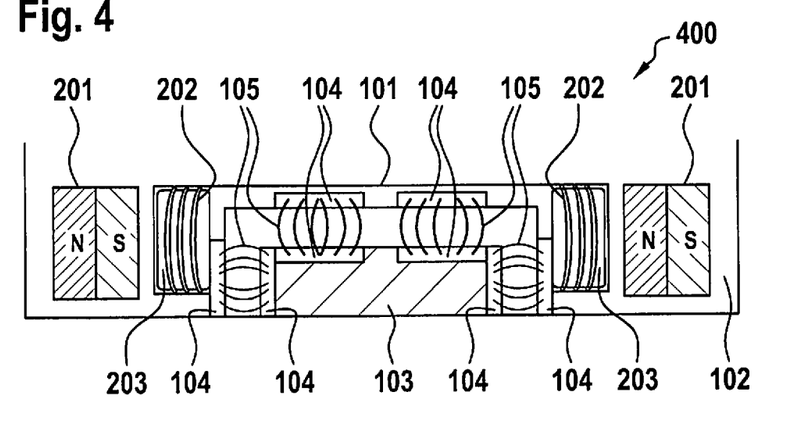
FIG. 4 shows a cross section of a sampling unit with a guide element, a movable component, and magnets of a linear drive, according to another example embodiment of the present invention.

FIG. 4 shows by way of example the cross section of a further sampling unit 400 according to another example embodiment. Guide element 103 and movable component 101 each has a different shape compared to the preceding examples. FIG. 4 also shows the magnets of the linear drive. The linear drive is implemented as a linear motor. Guide element 103 includes magnets 201 for this purpose. Magnets 201 are designed as permanent magnets in the example. Magnets 201 are positioned on both sides of guide element 103. Movable component 101 includes magnets 202 for implementing the linear drive. Magnets 202 are designed as electromagnets in the example. The electromagnets are designed as coils. Magnets 202 are positioned on the sides of component 101. Sampling unit 200 can be very stable as a result.

Figure 5:
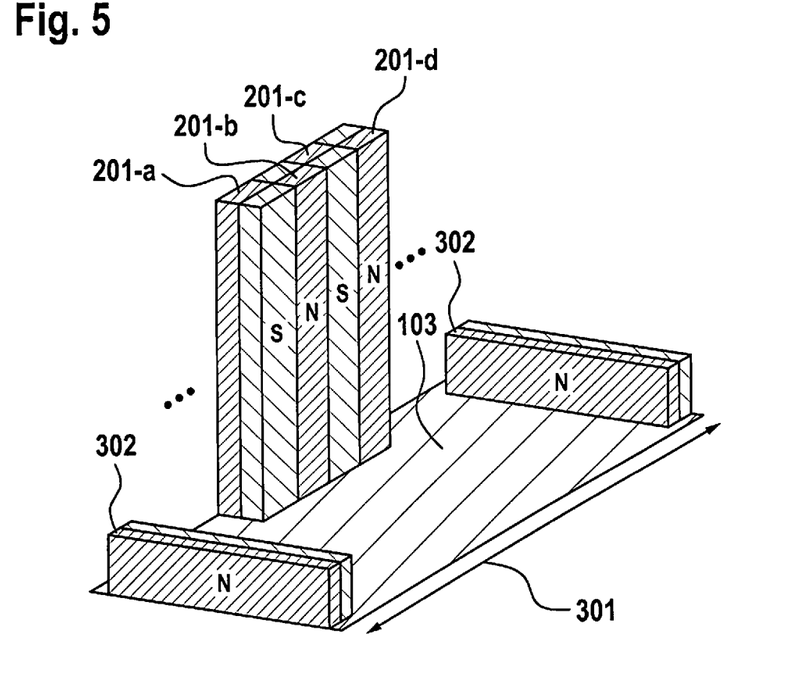
FIG. 5 shows a schematic illustration of a guide element of a sampling unit according to FIG. 4, including the magnets of a linear drive, according to an example embodiment of the present invention.

FIG. 5 schematically shows guide element 103 of sampling unit 400 from FIG. 4. Guide element 103, the same as in FIG. 3, is illustrated in a simplified form as a plane. For the sake of simplicity, only magnets 201 on one side of guide element 103 are illustrated. In the example shown, guide element 103 has a linear design. The plane of guide element 103 is correspondingly illustrated with a rectangular shape. Guide element 103 can also have some other shape, for example a semicircular shape. In this case, the plane can likewise have a semicircular shape. For a semicircular guide element 103, magnets 201 can be shaped and/or arranged in such a way that they match the shape of guide element 103. The following discussions apply for any shape of guide element 103.

Magnets 201 are designed as permanent magnets. A predefined number of magnets 201 are situated resting, in a manner of speaking, on the plane. Magnets 201 are situated in such a way that their respective north and south poles are situated in parallel to the plane and one above the other and perpendicular to movement direction 301. The four magnets 201-*a*, 201-*b*, 201-*c*, and 201-*d* are illustrated here as an example. The north pole and the south pole of magnets 201-*a*, 201-*b*, 201-*c*, and 201-*d* alternate with one another along movement direction 301. Due to the operating principle of the linear drive, in particular the linear motor, described above, movable component 101 (not shown for the sake of simplicity) can be moved along movement direction 301, along guide element 103 and within magnetic channel 102 of sampling unit 200. The position of movable component 101 on guide element 103 can be determined using the bearing controller of the magnetic bearing.

FIG. 5 also shows magnetic springs 302, which guide element 103 can include at its outer boundaries.

The cross section of a sampling unit according to the present invention can correspond to the cross section shown in FIG. 1A, 1B, 2, or 4. Movable component 101 or guide element 103 can also have other shapes not shown here. Magnets 104, 201, or 202 can be positioned at other locations of the sampling unit not shown here. Other cross sections of a sampling unit, not shown here, can thus be provided.

Figure 6:
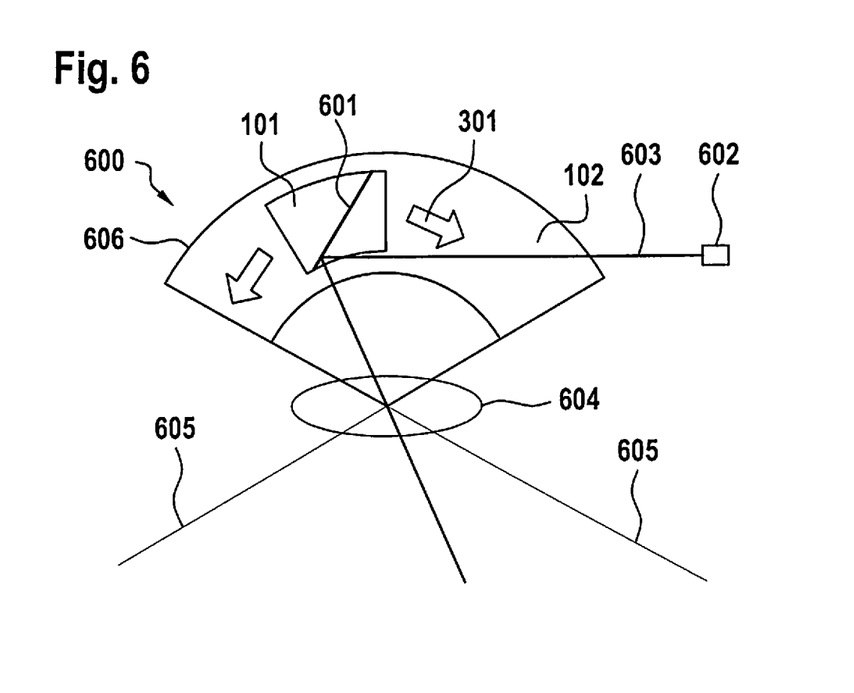
FIG. 6 shows a transmitting unit of a LIDAR sensor with a sampling unit according to an example embodiment of the present invention.
Figure 7:
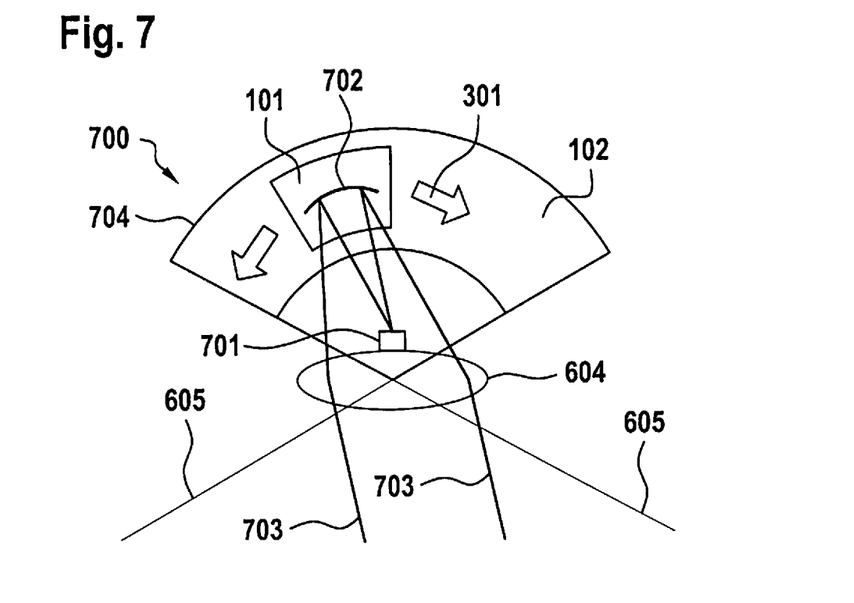
FIG. 7 shows a receiving unit of a LIDAR sensor with a sampling unit according to an example embodiment of the present invention.

A LIDAR sensor can be designed in such a way that its receiving unit and its transmitting unit are positioned next to one another in a plane. The installation height of the LIDAR sensor can thus be kept low. The receiving unit as well as the transmitting unit can each include a sampling unit according to the present invention. Such a transmitting unit is shown in FIG. 6. Such a receiving unit is shown in FIG. 7. A coaxial design with optically coupled paths can be achieved by combining this receiving unit and this transmitting unit.

FIG. 6 shows a transmitting unit 600 of a LIDAR sensor with a sampling unit 606. Magnetic channel 102 of sampling unit 606 has a semicircular shape. Movable component 101 can move within magnetic channel 102 along movement direction 301. Second reflective optical element 601 is situated on movable component 101. Second reflective optical element 601 is a mirror having a planar design. Transmitting unit 600 includes a light source 602 in the form of a laser. Laser 602 emits light 603, which is deflected via mirror 601. Light 603 passes through optical lens 604. The light is emitted into the sampling space indicated by the two straight lines 605. The angle spanned by the two straight lines 605 indicates the visual field of the LIDAR sensor in this plane.

FIG. 7 shows a receiving unit of a LIDAR sensor with a sampling unit 704. Magnetic channel 102 of sampling unit 704 has a semicircular shape. Movable component 101 can move within magnetic channel 102 along movement direction 301. First reflective optical element 702 is situated on movable component 101. First reflective optical element 702 is a mirror having a curved design. The two straight lines 605 indicate the sampling space. The angle spanned by the two straight lines 605 indicates the visual field of the LIDAR sensor in this plane. Light 703 that has been reflected by an object within the sampling space is received by receiving unit 700 of the LIDAR sensor. The light passes through optical lens 604 and reaches mirror 702. Light 703 is deflected onto detector 701 of receiving unit 700 via mirror 702.

Figure 8A:
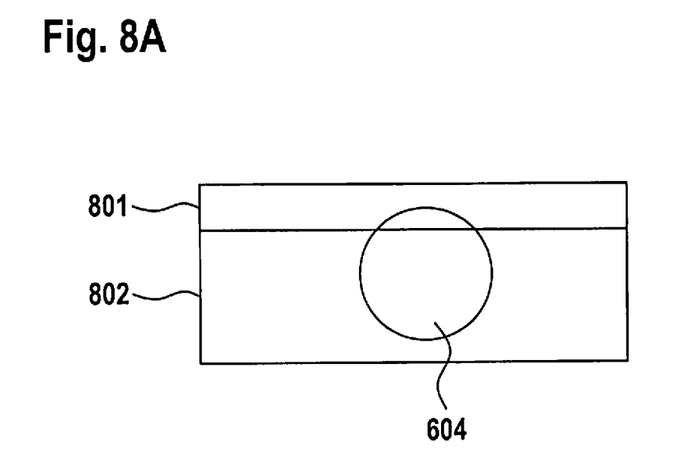
FIG. 8A shows a top view of a sampling unit of a LIDAR sensor, with the transmitting unit and receiving unit situated one above the other, according to an example embodiment of the present invention.

A LIDAR sensor can be designed in such a way that the receiving unit and the transmitting unit are positioned one above the other in a plane. FIG. 8A shows the top view onto one example embodiment of a sampling unit of a LIDAR sensor with a transmitting unit 801 and a receiving unit 802 situated above same. Transmitting unit 801 and receiving unit 802 can have the same or similar shape and design as in the preceding examples. In one example embodiment, transmitting unit 801 and receiving unit 802 can include a shared sampling unit. In this case, movable component 101 of shared sampling unit can include first reflective optical element 702 as well as second reflective optical element 604.

Figure 8B:
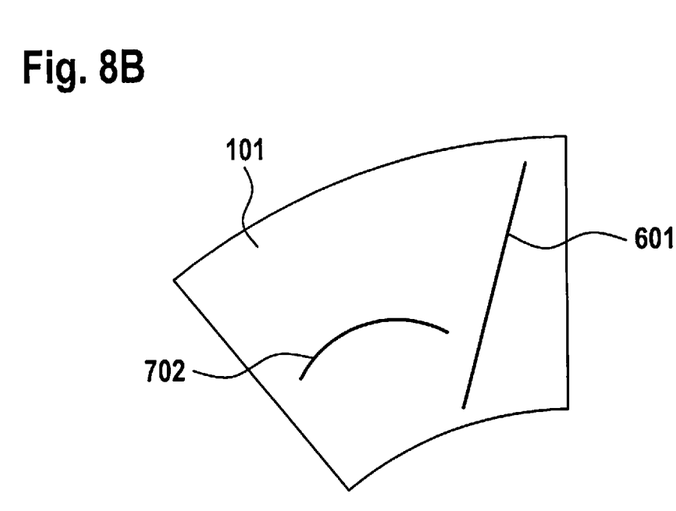
FIG. 8B shows a schematic illustration of a movable component of a sampling unit according to FIG. 8A, according to an example embodiment of the present invention.

First reflective optical element 702 and second reflective optical element 604 can be situated next to one another. First reflective optical element 702 and second reflective optical element 604 m can ay be situated one above the other. This is schematically illustrated in FIG. 8B. As illustrated in FIG. 8A, in one example embodiment transmitting unit 801 and receiving unit 802 include a shared optical lens 604.

Figure 9:
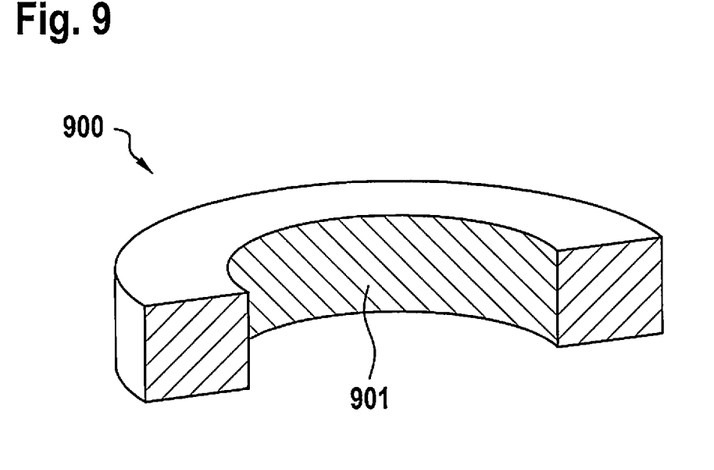
FIG. 9 shows a top view onto the front surface of a sampling unit of a LIDAR sensor, according to an example embodiment of the present invention.

FIG. 9 shows the top view onto front surface 901 of a sampling unit 900 of a LIDAR sensor. The sampling unit can have one of the shown shapes. The sampling unit can also have other shapes that are not shown. In the example, front surface 901 includes an optical filter. In the example, the optical filter is designed as a coating on front surface 901.

What is claimed is:

1. A LIDAR sensor for detecting an object within a sampling space, the LIDAR sensor comprising:
    a sampling unit that includes:
        a channel; and
        a movable component that includes a first reflective optical element, is situated within the channel, and is movable, under a magnetic force, so that the first reflective optical element shifts as whole within the channel from being entirely at a first position at one end of the channel to being entirely at a second position that is at an opposite end of the channel or revolves around an axis that is external to the first reflective optical element.

2. The LIDAR sensor of claim 1, wherein portions of the sampling unit are semicircular.

3. The LIDAR sensor of claim 1, wherein the channel is semicircular.

4. The LIDAR sensor of claim 1, further comprising:
    a detector for receiving light, wherein the first reflective optical element is configured to deflect onto the detector light that has been reflected from the object within the sampling space.

5. The LIDAR sensor of claim 4, wherein the detector is situated on a side of the sampling unit facing the sampling space.

6. The LIDAR sensor of claim 4, further comprising:
    a light source for emitting light into the sampling space, wherein the movable component includes at least one second reflective optical element configured to deflect the light that is emitted from the light source into the sampling space.

7. The LIDAR sensor of claim 1, further comprising:
    a light source for emitting light into the sampling space.

8. The LIDAR sensor of claim 1, further comprising:
    a refractive element situated on a side of the sampling unit facing the sampling space.

9. The LIDAR sensor of claim 1, further comprising:
    an optical filter situated on a side of the sampling unit facing the sampling space.

10. The LIDAR sensor of claim 1, further comprising:
    a light source for emitting light into the sampling space, wherein the first reflective optical element is configured to deflect the light that is emitted from the light source into the sampling space.

11. The LIDAR sensor of claim 1, wherein the movable component is movable so that the first reflective optical element shifts as a whole within the channel from being entirely at the first position at the one end of the channel to being entirely at a second position that is at the opposite end of the channel.

12. The LIDAR sensor of claim 1, wherein the movable component is movable so that the first reflective optical element revolves around the axis that is external to the first reflective optical element.

13. A LIDAR sensor for detecting an object within a sampling space, the LIDAR sensor comprising:
a sampling unit that includes:
a channel;
a guide; and
a movable component that is situated within the channel and is movable, under control of a magnetic force generated by the sampling unit, such that an entirety of the movable component shifts linearly along the guide between two opposite ends of the guide;
wherein, at each of the two opposite ends of the guide, the sampling unit includes a respective magnetic spring that is configured to produce a magnetic force that opposes the magnetic force by which the movable component is moved towards the respective end of the guide, so that the movable component cannot reach either of the two opposite ends of the guide.

14. The LIDAR sensor of claim 13, wherein the guide is designed as a magnetic bearing.

15. The LIDAR sensor of claim 14, wherein the sampling unit also includes at least one permanent magnet.

16. The LIDAR sensor of claim 13, wherein the movable component is movable along the guide with oscillation.

17. The LIDAR sensor of claim 13, wherein the movable component is movable along the guide with resonant oscillation.

18. The LIDAR sensor of claim 13, wherein the magnetic springs are arranged on the guide.

19. The LIDAR sensor of claim 13, wherein each of the guide and the movable component includes a permanent magnet.

20. The LIDAR sensor of claim 13, wherein the guide includes a plurality of permanent magnets arranged so that respective positions of north and south poles of the magnets alternate between each pair of immediately adjacent ones of the plurality of magnets.

21. The LIDAR sensor of claim 13, wherein the guide includes a plurality of permanent magnets arranged so that respective positions of north and south poles of the magnets alternate, in a direction of movement of the movable component, between each pair of immediately adjacent ones of the plurality of magnets.

22. A method for controlling a LIDAR sensor for detecting an object within a sampling space, the LIDAR sensor including a sampling unit, the method comprising:
controlling, with a linear drive, movement of a movable component of the sampling unit within a magnetic channel and along a guide such that an entirety of the movable component shifts linearly along the guide between two opposite ends of the guide, wherein, at each of the two opposite ends of the guide, the sampling unit includes a respective magnetic spring that produces a magnetic force that opposes a magnetic force by which the movable component is moved towards the respective end of the guide, so that the movable component cannot reach either of the two opposite ends of the guide.

23. The method of claim 22, wherein the guide is designed as a magnetic bearing, the method further comprising:
controlling the magnetic bearing with a bearing controller.

24. The method of claim 23, further comprising:
determining, with the bearing controller, a position of the movable component on the guide.

* * * * *